US006831759B1

(12) United States Patent
Witte et al.

(10) Patent No.: US 6,831,759 B1
(45) Date of Patent: Dec. 14, 2004

(54) LIGHT SOURCE SHUTTER FOR SCANNING TRANSPARENT MEDIA THROUGH OVERHEAD REFLECTIVE LIGHT PATH

(75) Inventors: Stephen B. Witte, Poway, CA (US); Glenn Gaarder, Ramona, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/527,143

(22) Filed: Mar. 16, 2000

(51) Int. Cl.[7] .................................................. H04N 1/04
(52) U.S. Cl. ........................ 358/474; 358/487; 358/475; 358/497
(58) Field of Search ................................. 358/487, 474, 358/475, 468, 497, 509; 355/71

(56) References Cited

U.S. PATENT DOCUMENTS

| | | | | |
|---|---|---|---|---|
| 4,989,099 A | * | 1/1991 | Koshiyouji et al. | 358/474 |
| 5,463,217 A | * | 10/1995 | Sobol et al. | 250/234 |
| 6,151,139 A | * | 11/2000 | Haded et al. | 358/487 |

* cited by examiner

Primary Examiner—Kimberly Williams
Assistant Examiner—Negussie Worku

(57) ABSTRACT

An optical scanner system wherein the central region of the light source is selectively covered up by a mechanically actuated shutter during a transparency scanning mode. By occluding the central portion of the light source, problems with flare and degraded image quality are eliminated. The shutter is actuated to its two positions (normal reflective mode position, transparency mode position) by pins, protrusions, or the scanner walls in the scan module path. When the scan module is driven to the extremes of its travel the shutter is either driven open or closed. A bracket structure is provided to hold the transparent media and a covering light reflective tent, and can include the pin or pins that can protrude into the scanner module path and thus actuate the shutter only when the structure is mounted on to the scanner by the user. The bracket structure can include a lower member that rests directly on the platen glass to align filmstrips, slides, and other transparent media. The tent structure is hinged relative to the lower structure which allows it to be opened and closed to enable insertion of transparent media. When the tent structure is closed it acts as the reflective light path to allow light from the primary light source to be reflected up, over, and down through the transparent media, and into the optical light path leading to the optical sensor.

16 Claims, 5 Drawing Sheets

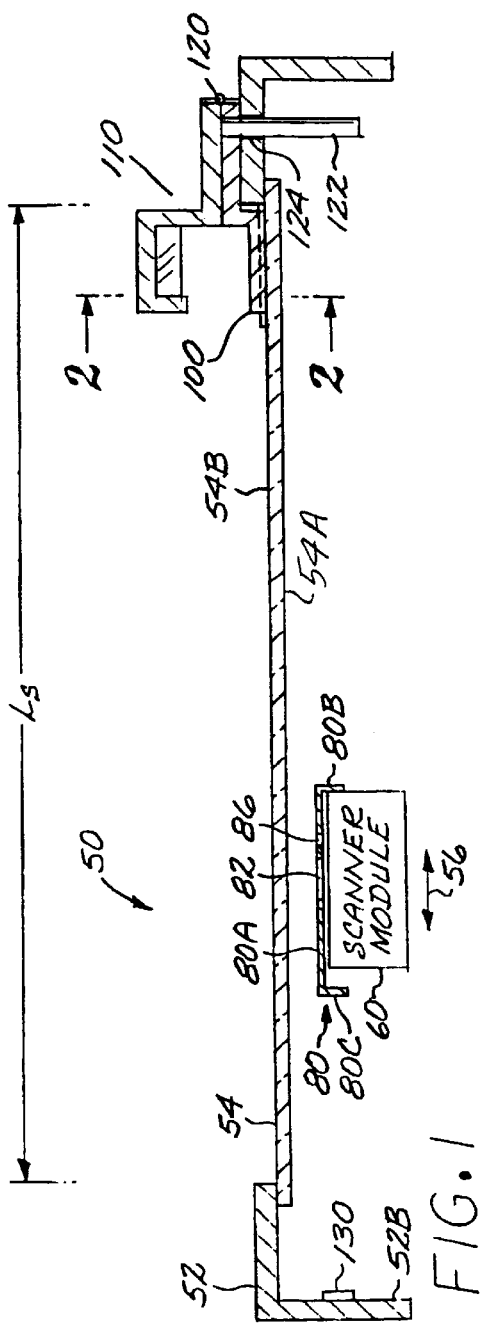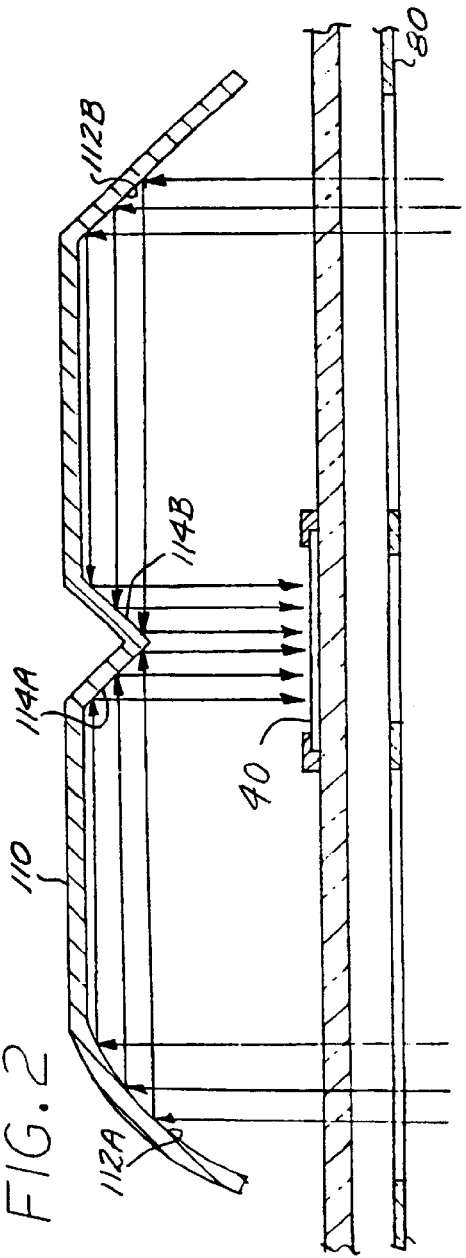

LIGHT SOURCE SHUTTER FOR SCANNING TRANSPARENT MEDIA THROUGH OVERHEAD REFLECTIVE LIGHT PATH

TECHNICAL FIELD OF THE INVENTION

The present invention relates to optical scanning devices.

BACKGROUND OF THE INVENTION

Optical scanners are employed to scan a visible image such as a text image on a paper or other print medium, a photograph, negative, or transparency, and provide an electronic version of the scanned image suitable for copying, storing or processing by a computer. A reflective optical scanner typically has a controlled source of illumination light which is reflected off the surface of a document onto an array of photosensitive elements, i.e. an optical sensor. The sensor converts the received light intensity into an electronic signal. Transparency scanners pass illumination light through a transparent image such as a photographic positive slide or negative film image and then onto an optical sensor.

It would be advantageous to provide a technique for utilizing a reflective scanner to optically scan a transparent image.

One known technique for transparency scanning involves turning the internal light source off and turning on an external light source to backlight the transparent film. This solution requires the external light source, cabling and power source and these additional elements add to the cost. Another technique is to use a reflecting "tent" structure to reflect light from the internal light source over the top and down through the transparent media. This second approach, although being much less expensive than the first approach, can suffer from an optical flare problem. The primary light source not only gets projected over and down through the transparent media but also directly illuminates the underside of the media resulting in optical flare and degraded image quality.

SUMMARY OF THE INVENTION

In accordance with an aspect of this invention, an optical scanner system is described, wherein the central region of the light source is selectively covered up by a mechanically actuated shutter during a transparency scanning mode. By occluding the central portion of the light source the aforementioned problems with flare and degraded image quality are eliminated.

By eliminating external light source and its related power supply etc. a considerable cost savings can be realized while achieving the same quality image that can be achieved with the external light source components by means of this shutter. In accordance with a further aspect of the invention, the shutter is actuated to its two positions (normal reflective mode position, transparency mode position) by pins, protrusions, or the scanner walls in the scan module path. When the scan module is driven to the extremes of its travel the shutter is either driven open or closed.

A bracket structure is provided to hold the transparent media and the covering light reflective tent. This bracket structure can include a pin or pins that can protrude into the scanner module path and thus actuate the shutter only when the structure is mounted on to the scanner by the user. This bracket structure can include a lower member that rests directly on the glass to align filmstrips, slides, and other transparent media and which also holds the actuating pins. The bracket can also have an upper tent structure that is hinged relative to the lower structure which allow it to be opened and closed to enable insertion of transparent media. When the upper structure is closed it acts as the reflective light path to allow light from the primary light source to be reflected up, over, and down through the transparent media, and into the optical light path leading to the optical sensor.

BRIEF DESCRIPTION OF THE DRAWING

These and other features and advantages of the present invention will become more apparent from the following detailed description of an exemplary embodiment thereof, as illustrated in the accompanying drawings, in which:

FIG. 1 is a simplified longitudinal cross-sectional view of a scanner system employing the present invention.

FIG. 2 is a cross-sectional view taken along line 2—2 of FIG. 1.

DETAILED DESCRIPTION OF THE PREFERRED EMBODIMENTS

Figure 3:
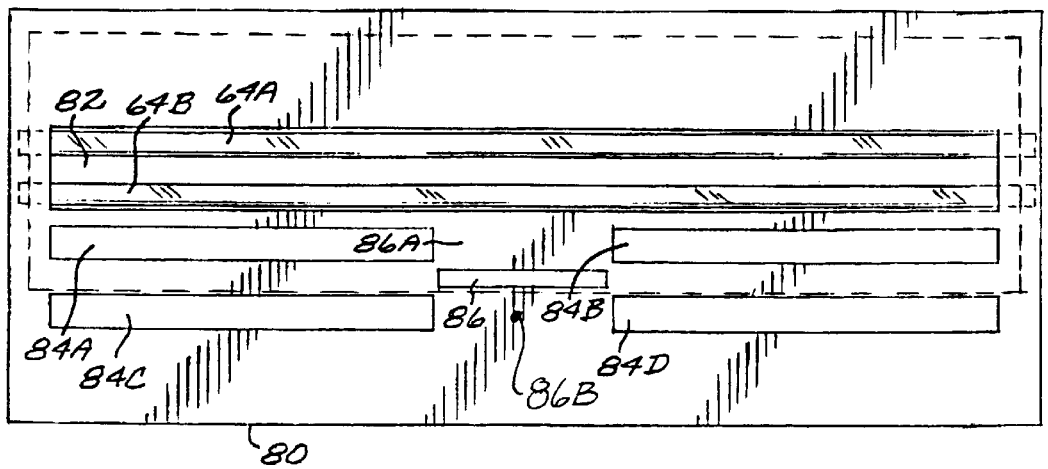
FIG. 3 is a top view of the scanner module and shutter, showing the shutter in the normal scanning position.
Figure 4:
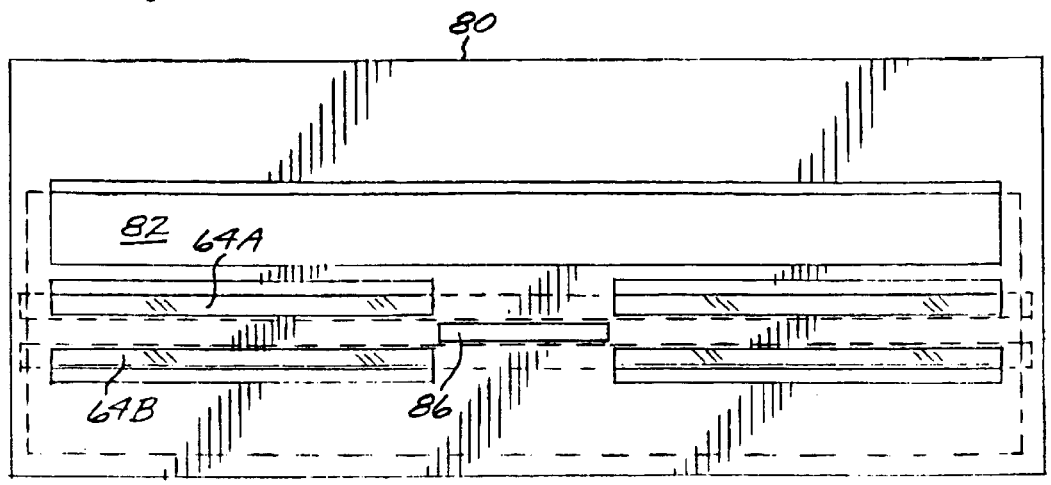
FIG. 4 is a top view of the scanner module and shutter, showing the shutter in the transparency scanning position.

An optical scanner apparatus 50 embodying aspects of this invention is shown in simplified form in FIGS. 1–6. The apparatus includes a frame 52 and a glass platen 54 against which the target to be scanned is positioned during a scan operation. Typically, the target is a flat sheet, say paper, bearing an image such as text and/or graphics. Disposed within the frame is a scanner module 60 mounted for scanning movement along axis 56 adjacent the undersurface of the platen 54. The module is arrange to move over a nominal scan range indicated as $L_S$ in FIG. 1 during normal reflective scan mode operation. The scanner module 60 includes a source of illumination light for illuminating an area of the target, which typically illuminated a narrow portion of the scan area in direction 56, across the entire width or lateral extent of the scan region. The module further includes optical elements for directing reflected light from the target onto an optical sensor, typically a CCD linear array of light sensitive elements.

To the extent just described, the scanner system 50 is conventional. In accordance with an aspect of the invention, a shutter structure 80 is positioned over the module between the module 60 and the undersurface 54A of the platen. The shutter structure has two working positions with respect to the scanner module. The first position is for normal reflective scanning operation, wherein illumination light is permitted to pass through a shutter window 82 which extends across the entire lateral extent of the light source. The second position is for transparency scanning. In this position, the central region of the illumination light path is occluded by the shutter top surface. This prevents light from illuminating the undersurface of the platen in the area directly above the occluded region, to prevent optical flare and degraded image quality.

Figure 5:
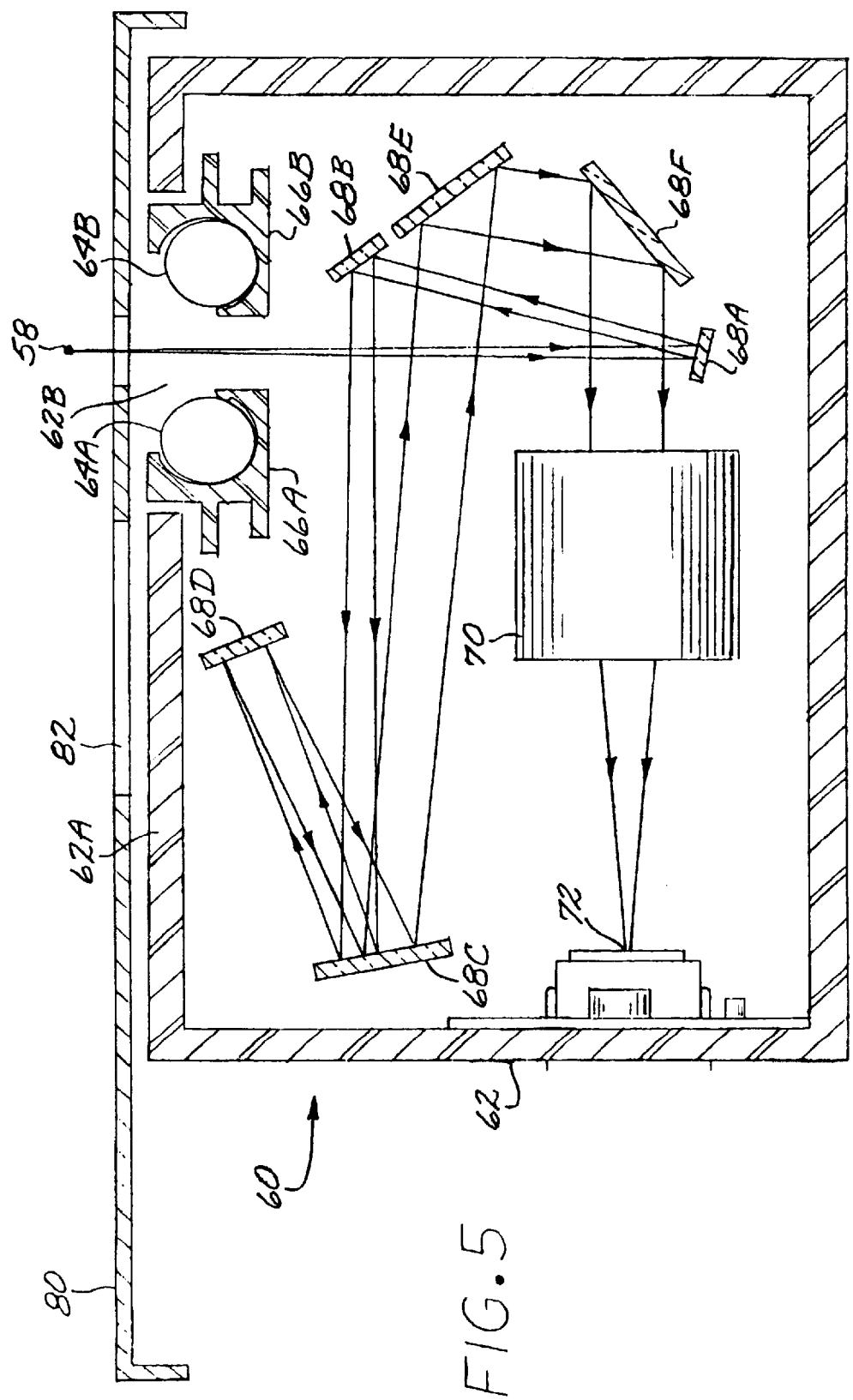
FIG. 5 is a simplified cross-sectional view of the scanner module and shutter.
Figure 6:
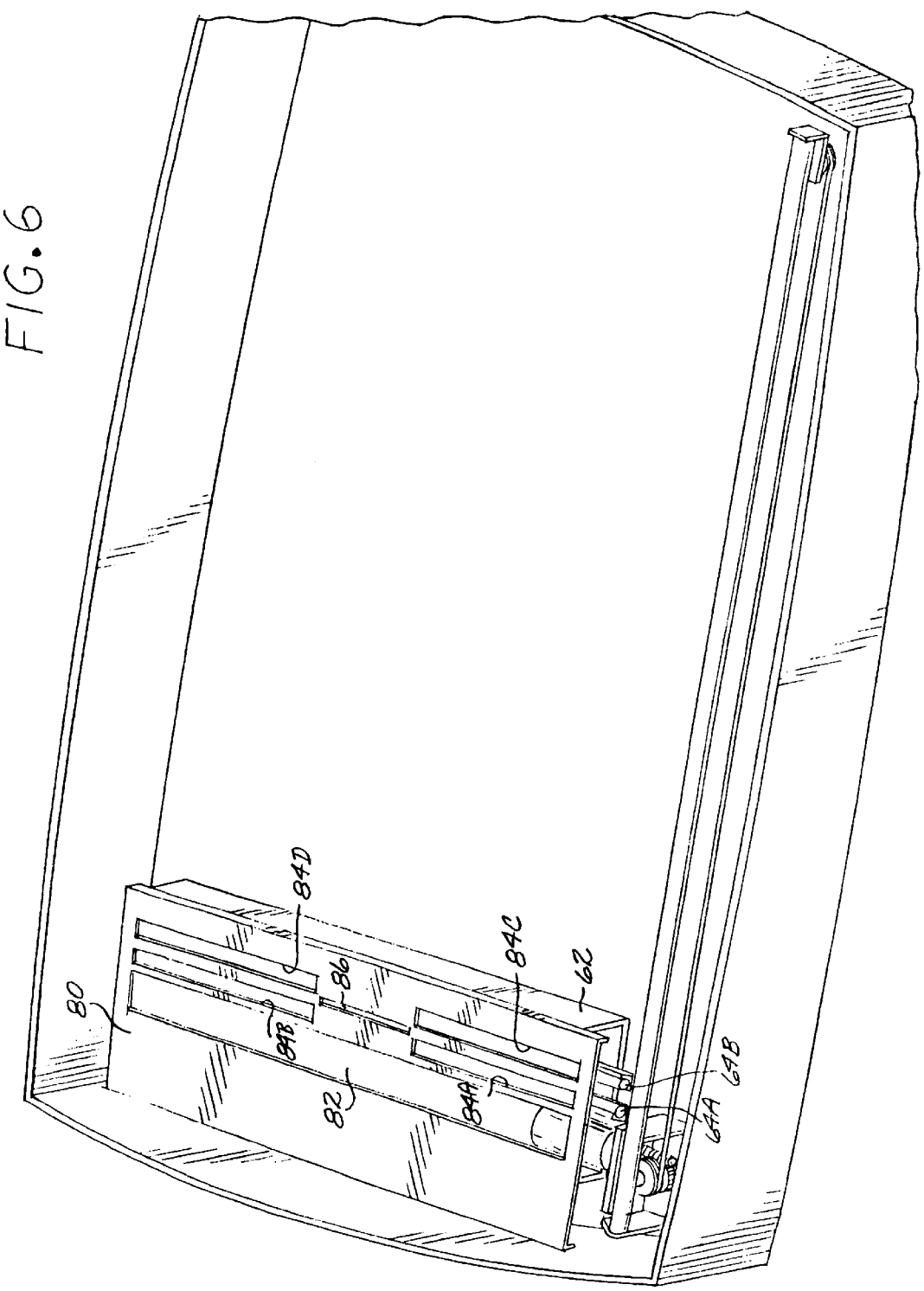
FIG. 6 is an isometric view of a portion of the scanner system of FIG. 1, and with the platen glass removed.

FIG. 5 shows the scanner module 60 in further detail. The module includes a housing 62 having a top wall 62A with an elongated window 62B formed laterally therein. A pair of tubular light sources, such as cold cathode fluorescent (CCFL) or xenon tubes, are spaced apart beneath the window 62B and supported by brackets 66A and 66B. The light sources can be selectively activated during optical scanning processes. While two light sources are shown in this embodiment, it will be appreciated that a single light source could be employed, or even more that two light sources, and still practice aspects of this invention. A series of mirror surfaces indicated as 68A–68F are employed to direct light from the scan line 58 to lens 70 and then to the optical sensor 72. In this exemplary embodiment, the sensor 72 is a CCD linear array of light sensitive elements arranged in a direction generally transverse to the plane of FIG. 5. Of course, for color scanning operation, several arrays can be employed.

In the reflective scanning mode, the shutter 80 is positioned with the relatively large window 82 positioned over the light sources 64A, 64B. In this position, the shutter 80 allows the illumination light to pass through the window across the entire lateral extent of the scan region. For the transparency scanning mode, the shutter is moved to the position shown in FIG. 5. The shutter includes four partial width windows 84A–84D, with windows 84A, 84B positioned over portions of the light source 64A, and with windows 84C, 84D positioned over portions of the light source 64B. A slit 86 is formed in the shutter at a position underlying the transparency target position, so that illumination light passing through the target from above will pass through the slit 86 and into the scanner module input light path. The shutter 80 includes regions 86A, 86B which are solid (opaque) and occlude adjacent regions of the light sources. The occluding regions together with the narrowness of the slit 86 prevent or minimize illumination light from reflecting off the bottom surface of the target and entering the scanner input light path, creating flare and optical aberrations. An exemplary width dimension of the slit 86 is in the range of 3 mm to 5 mm, to account for color spacing and alignment tolerances.

In this embodiment, a transparent media holder 100 is positioned adjacent one longitudinal end of the scan area, to hold a transparent medium 40 (FIG. 2), such as a transparent positive photographic slide or negative film. This slide 40 in this embodiment has a much smaller area than the normal scan area, but it will be appreciated that the invention is not limited to relatively small transparent media. The holder 100 is a frame with an open end into which the slide or negative film 40 is fitted. The holder 100 thus positions the media 40 against the upper surface 54B of the platen.

A reflective tent structure 110 is fitted over the holder 100 structure for use during transparency scanning. The purpose of the structure 110 is to reflect illumination light passing upwardly through openings in the shutter and reflect the light downwardly through the transparency and into the scanner module light path toward the optical sensor array. In this mode, the sensor will respond to an image created by illumination light passing through the transparency. FIG. 2 is a cross-sectional view taken along line 2—2 of FIG. 1., showing the reflection of illumination light rays from lateral portions of the tent 110. Illumination light from the sources 64A–64B is passed through the windows 84A–84D, reflected laterally from surfaces 112A, 112B toward the center of the tent and then reflected downwardly by reflective surfaces 114A–114B onto the transparency target 40 and through the target into the scanner input light path.

It will be appreciated that the reflective surfaces 112A, 112B can be curved or lens-shaped to gather more light, as illustrated as surface 112A. Alternatively, the reflective surfaces can be planar.

Referring again to FIG. 1, the transparency holder and tent structure 100, 110 in this exemplary embodiment is a removable assembly. The tent structure 110 is hingedly attached to the holder 100 by a hinge 120. A pin structure 122 extends downwardly from the holder 100, and is sized to fit through an opening 124 formed in the frame 52 adjacent the platen glass area. There can be a plurality of pins for stability if desired for a particular application. Thus, the assembly can be easily removed from the scanner frame to allow reflective scanning operations. When the user desired to scan a transparency, the holder/tent assembly is positioned on the frame with the pin 122 in place.

To position the shutter to the transparency scanning position shown in FIG. 5, the scanner module is driven to the extreme right position so that the edge 80B of the shutter is driven against the pin 122. The shutter is mounted for sliding movement relative to the scanner module, and so the shutter will be stopped by the pin while the module continues to move to the right, providing relative motion between the shutter and scanner until the shutter is positioned as shown in FIG. 5. Those skilled in the art will appreciate that there are many types of slide structures which could be employed to accommodates the sliding movement of the shutter. For example, the shutter could be fabricated of a sheet metal which slides within slots at the top of the scanner module housing. Now the scanner is ready for transparency scanning operations, and the scanner module is driven along the scan axis under the transparency holder to accomplish the scan operation. The scanner will be commanded to the transparency mode through a front panel switch command or command received from a host computer. This command will initiate the shutter moving operation. When the user is finished with the transparency mode and wishes to reconfigure the scanner for normal reflective scanning operations, another command is given, so that the scanner module is driven to the left, and left edge 80C of the shutter runs against the stop element 130 mounted on the wall 52B of the frame. As the scanner module continues its motion to the left, the shutter is stopped, sliding the shutter relative to the module 70 until the shutter is positioned in the normal reflective mode position (FIG. 3). Now the scanner is ready for reflective mode operation.

Figure 7:
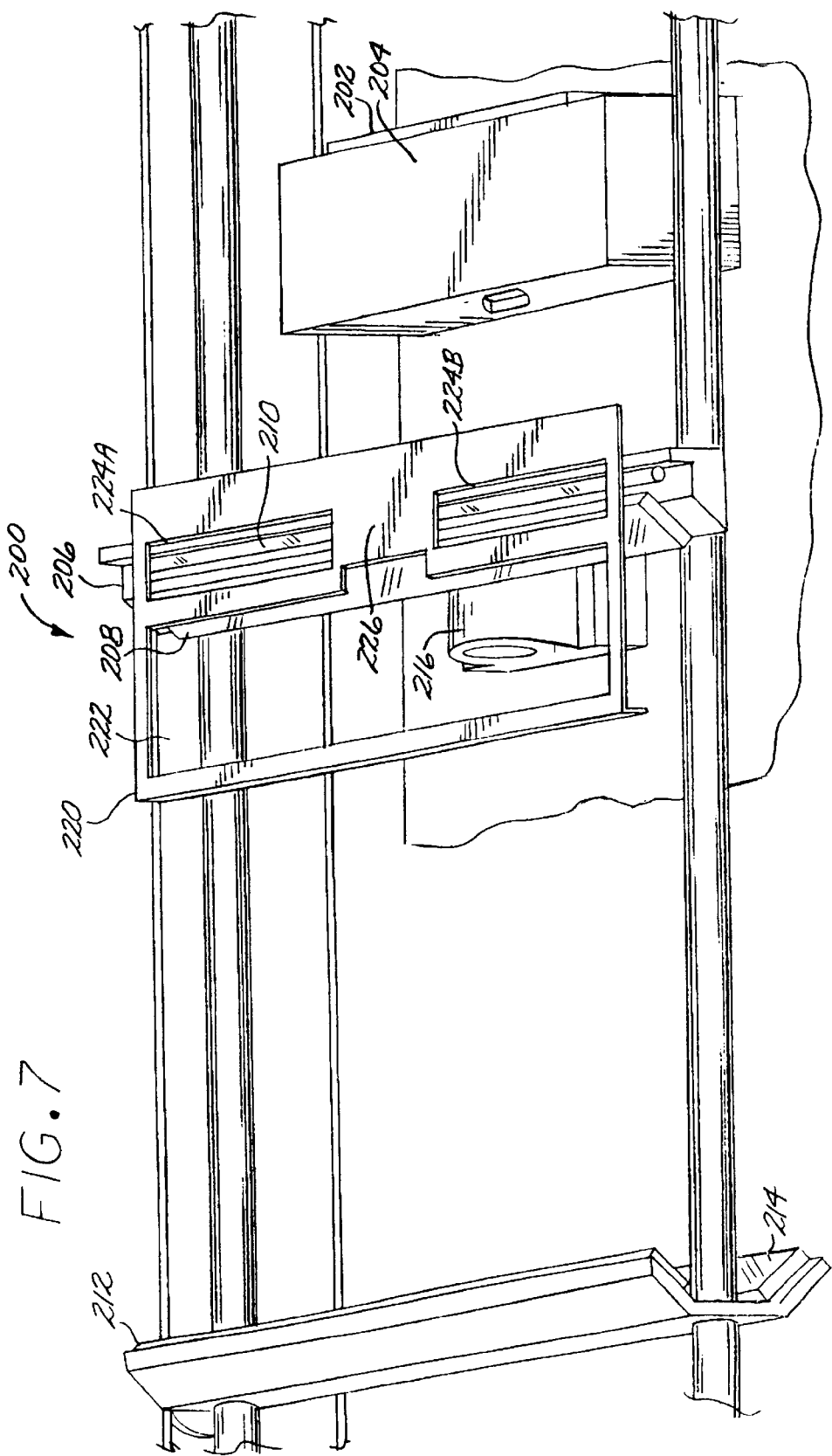
FIG. 7 is a simplified isometric view of an alternate embodiment of a scanner system in accordance with the invention.

While the foregoing embodiment is for a scanner with a moving scanner module, the invention is not limited to this implementation. For example, the invention can be employed with a scanner of the type having a fixed optical sensor and moving carriages carrying a light source and a reflector mirror, respectively. An example of this type of scanner is shown in FIG. 7. Here, the scanner 200 includes a fixed optical sensor 202 mounted to a sensor housing 204 fixed to a frame of the scanner. Illumination light is generated by a light source 210 mounted on a moving scan carriage 206. Light reflected from the target is reflected by mirror 208 mounted on carriage 206, and directed to another mirror structure 214 mounted on moving carriage 212. The mirror 214 directs the reflected light to lens 216 which images the light onto the optical sensor 202.

To the extent just described, the scanner 200 is of conventional design. In accordance with the invention, a shutter structure 220 is mounted on the moving scan carriage. As with the shutter 80 of the embodiment of FIGS. 1–6, the shutter structure 220 includes a window 222 which extends across the lateral extent of the scan region, which is used for normal reflective scanning. The shutter structure 220 also includes windows 224A, 224B, which extend only across portion of the lateral extent of the scan region, and which includes an opaque region 226 in the center region which blocks the center region of the light source. The center region underlays the transparency scanning region, thus blocking direct illumination light from reflecting from the bottom surface of the transparency.

The shutter structure 220 is mounted on the carriage 206 for sliding movement relative to the light source carriage by the carriage. The carriage movement can also be employed to move the shutter from the reflective scan position to the transparency scan position (shown in FIG. 7). Not shown in FIG. 7 is the reflector structure and the transparency holder, which can be similar to the corresponding structures 110 and 100 of FIGS. 1–6.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. An optical scanner with a transparency scanning mode, comprising:
    an internal optical sensor;
    a shutter structure interposed between an internal light source and a transparency image area during a transparency scanning mode, the shutter structure including an opaque portion substantially occluding the transparency image area from direct light passing from said light source through said transparency image area, one or more first window regions permitting light from the light source to pass therethrough in one or more platen areas outside the transparency image area, and a second window region permitting light to pass through said transparency image area into an input scanner optical path;
    a reflector structure positioned on an external surface of a platen during the transparency scanning mode, wherein some of the light from the internal light source that passes through a reflective image area but outside the transparency image area is redirected by said reflector structure through the transparency image area and back into said input optical path.

2. The scanner of claim 1 wherein the light source and optical sensor are disposed in a scanner module, the scanner module movable along a scan axis during optical scanning operations.

3. The scanner of claim 1 wherein the shutter structure is positionable during a reflective scanning mode for providing a third window region between the light source and the reflective image area, the third window region permitting light from the light source to pass therethrough across a lateral extent of the reflective image area without occlusion.

4. The scanner of claim 3 wherein the shutter is movable between a reflective scanning position where in the third window region is in a first working position relative to the light source, and a transparency scanning position wherein the first and second window regions are positioned for working relative to the light source.

5. The scanner of claim 1 further comprising a transparency holder structure for holding a transparency target at the transparency image area during a reflective scanning operation.

6. The scanner of claim 5 further comprising a frame structure, and wherein said holder structure is positioned relative to the transparency image area by a pin structure engaging said frame structure.

7. The scanner of claim 6 wherein the light source and optical sensor are disposed in a scanner module, the scanner module movable along a scan axis during optical scanning operations, and wherein said shutter structure is actuated between a reflective scanning position and a transparency scanning position by movement of said scanner module along a scan axis outside a reflective travel area or a transparency travel area.

8. An optical scanner with a reflective scanning mode and a transparency scanning mode, comprising:
    a platen for receiving on a first surface a target to be scanned, with a reflective image area on the platen and a transparency image area that is smaller than the reflective image area and contained within the reflective image area;
    an elongated light source for illuminating a portion of said reflective image area, said portion extending across a lateral extent of the reflective image area, and an internal optical sensor mounted in a scanner module, the scanner module mounted for movement along a scan axis adjacent a second surface of the platen and transverse to said lateral extent;
    a shutter structure interposed between the internal light source and the transparency image area during a transparency scanning mode, the shutter structure including an opaque portion substantially occluding the transparency image area from direct light passing from the light source through the platen, one or more first window regions permitting light from the light source to pass therethrough in one or more platen areas outside the transparency image area, and a second window region permitting light to pass through the transparency into an input scanner optical path;
    a removable reflector structure positioned on an external surface of the platen during the transparency scanning mode, wherein some of the light from the internal light source that passes through the reflective image area but outside the transparency image area is redirected by the reflector structure through the transparency image area and back into an input optical path of the scanner.

9. The scanner of claim 8 wherein the shutter structure is positionable during the reflective scanning mode for providing a third window region between the light source and the reflective image area, the third window region permitting light from the light source to pass therethrough across a lateral extent of the reflective image area without occlusion.

10. The scanner of claim 9 wherein the shutter is movable between a reflective scanning position wherein the third window region is in a first working position relative to the light source, and a transparency scanning position wherein the first and second window regions are in a second working position.

11. The scanner of claim 8 wherein the optical sensor includes a linear array of photosensitive elements.

12. The scanner of claim 8 further comprising a removable transparency holder structure for holding a transparency target at the transparency image area during the reflective scanning operation, and wherein the reflector structure and the transparency holder are removed for reflective scanning operation.

13. A method of optically scanning a transparent image-bearing target, comprising:
    activating an illumination light source to generate illumination light;
    occluding a light path from the light source to one side of the target;

passing at least a portion of the illumination light in a reflected light path about a periphery of the target without passing through the target from the one side to another side of the target, such that said portion of the illumination light passes through the target from the another side to the one side; and directing said portion of the illumination light that has passed through the reflected light path and through the target onto the optical sensor.

14. A scanner for optically scanning a transparent image-bearing target, comprising:

an illumination light source for generating illumination light;

means for occluding a light path from the light source to one side of the target;

means for passing at least a portion of the illumination light in a reflected light path about a periphery of the target without passing through the target from the one side to another side of the target, such that said portion of the illumination light passes through the target from the another side to the one side; and means for directing said portion of the illumination light that has passed through the reflected light path and through the target onto the optical sensor.

15. An optical scanner with a transparency scanning mode, comprising:

an internal light source;

an internal optical sensor;

a reflective image area on a platen;

a transparency image area on the platen;

a shutter structure interposed between the internal light source and the transparency image area during a transparency scanning mode, the shutter structure including an opaque portion substantially occluding the transparency image area from direct light passing from the light source through the platen, one or more first window regions permitting light from the light source to pass therethrough in one or more platen areas outside the transparency image area, and a second window region permitting light to pass through the transparency into an input scanner optical path;

a reflector structure positioned on an external surface of the platen during the transparency scanning mode, wherein some of the light from the internal light source that passes through the reflective image area but outside the transparency image area is redirected by the reflector structure through the transparency image area and back into an input optical path of the scanner.

16. A method of optically scanning a transparent image-bearing target having a first side and a second side, comprising:

providing an optical sensor and an illumination light source in a housing with a transparent platen;

placing the target on a first surface of the platen;

activating the illumination light source to generate illumination light;

occluding a light path from the light source to the first side of the target;

passing at least a portion of the illumination light in a reflected light path about a periphery of the target without passing through the target from the first side to the second side, such that said portion of the illumination light passes through the target from the second side to the first side; and directing said portion of the illumination light that has passed through the reflected light path and through the target onto the optical sensor.

* * * * *